United States Patent
Koizumi et al.

(10) Patent No.: US 8,228,627 B2
(45) Date of Patent: Jul. 24, 2012

(54) MAGNETIC DISK DRIVE

(75) Inventors: Gaku Koizumi, Ome (JP); Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/641,157

(22) Filed: Dec. 17, 2009

(65) Prior Publication Data

US 2010/0157462 A1 Jun. 24, 2010

(30) Foreign Application Priority Data

Dec. 19, 2008 (JP) ................................. 2008-324330

(51) Int. Cl.
*G11B 5/02* (2006.01)
*G11B 5/127* (2006.01)
(52) U.S. Cl. ......... 360/26; 360/25; 360/46; 360/125.01; 360/125.02; 360/125.04
(58) Field of Classification Search .................. None
See application file for complete search history.

(56) References Cited

U.S. PATENT DOCUMENTS

| | | | |
|---|---|---|---|
| 4,317,148 A * | 2/1982 | Chi | 360/125.22 |
| 4,535,369 A * | 8/1985 | Sawazaki | 360/55 |
| 4,703,382 A | 10/1987 | Schewe et al. | |
| 4,816,947 A * | 3/1989 | Vinal et al. | 360/321 |
| 5,396,391 A | 3/1995 | Tanaka et al. | 360/125.02 |
| 6,038,093 A * | 3/2000 | Takada et al. | 360/66 |
| 6,473,258 B1 * | 10/2002 | Shitara et al. | 360/67 |
| 6,710,972 B1 | 3/2004 | Mochizuki et al. | |
| 6,934,128 B2 * | 8/2005 | Tsuchiya et al. | 360/317 |
| 7,180,704 B2 * | 2/2007 | Mochizuki et al. | 360/123.12 |
| 7,791,829 B2 * | 9/2010 | Takeo et al. | 360/55 |
| 7,952,827 B2 * | 5/2011 | Ohta et al. | 360/59 |
| 8,094,399 B2 * | 1/2012 | Roppongi et al. | 360/55 |
| 2004/0075940 A1 * | 4/2004 | Bajorek et al. | 360/110 |
| 2005/0088786 A1 * | 4/2005 | Gill | 360/324.2 |
| 2006/0176599 A1 * | 8/2006 | Semba | 360/51 |
| 2008/0075977 A1 * | 3/2008 | Kudo et al. | 428/800 |
| 2008/0165452 A1 * | 7/2008 | Bozeman et al. | 360/319 |
| 2008/0218902 A1 * | 9/2008 | Hosono et al. | 360/125.02 |
| 2008/0273268 A1 * | 11/2008 | Hsiao et al. | 360/234.6 |

(Continued)

FOREIGN PATENT DOCUMENTS

JP 03-22644 3/1991

(Continued)

OTHER PUBLICATIONS

Japanese Official Action dated Apr. 8, 2010 for Japanese Patent Application 2008-324330.

(Continued)

*Primary Examiner* — Dismery Mercedes
(74) *Attorney, Agent, or Firm* — Knobbe, Martens, Olson & Bear, LLP

(57) ABSTRACT

According to one embodiment, a magnetic disk drive includes a magnetic disk to be subjected to perpendicular recording, a first pole core including a main pole configured to record signals on the magnetic disk, a first coil wound around the first pole core, a second pole core magnetically independent of the first pole core, tip ends of which are arranged on both sides of the main pole, a second coil wound around the second pole core, a read unit including an element configured to read data recorded on the magnetic disk, and a correction unit configured to correct a current phase difference between the first and second coils.

7 Claims, 11 Drawing Sheets

U.S. PATENT DOCUMENTS

2009/0097156 A1* 4/2009 Yamamoto ............... 360/77.08
2010/0007992 A1* 1/2010 Yamada et al. ............ 360/244

FOREIGN PATENT DOCUMENTS

| JP | 05-094603 | 4/1993 |
| JP | 2004-164783 | 6/2004 |
| JP | 2006-216198 A | 8/2006 |
| JP | 2007-265571 | 10/2007 |
| JP | 2008-077723 | 4/2008 |

OTHER PUBLICATIONS

K. Nakamoto et al.,"CPP-GMR reader and wraparound shield writer for perpendicular recording," IEEE Transaction on Magnetics, pp. 2914-2919, vol. 41, No. 10, Oct. 2005.
Explanation of Non-English Language Reference(s).

* cited by examiner

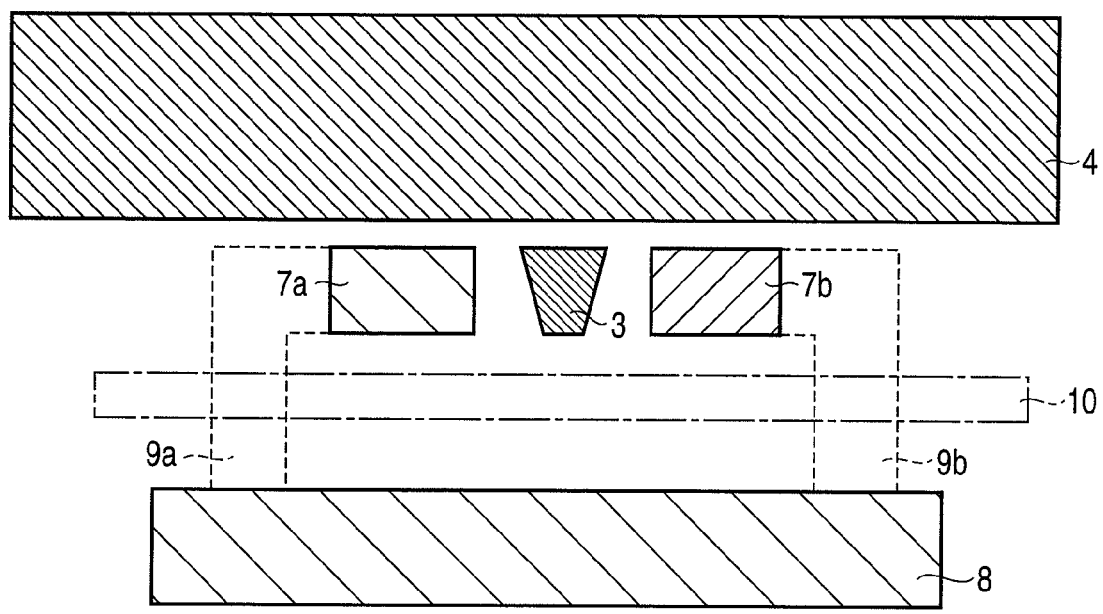
F I G. 3

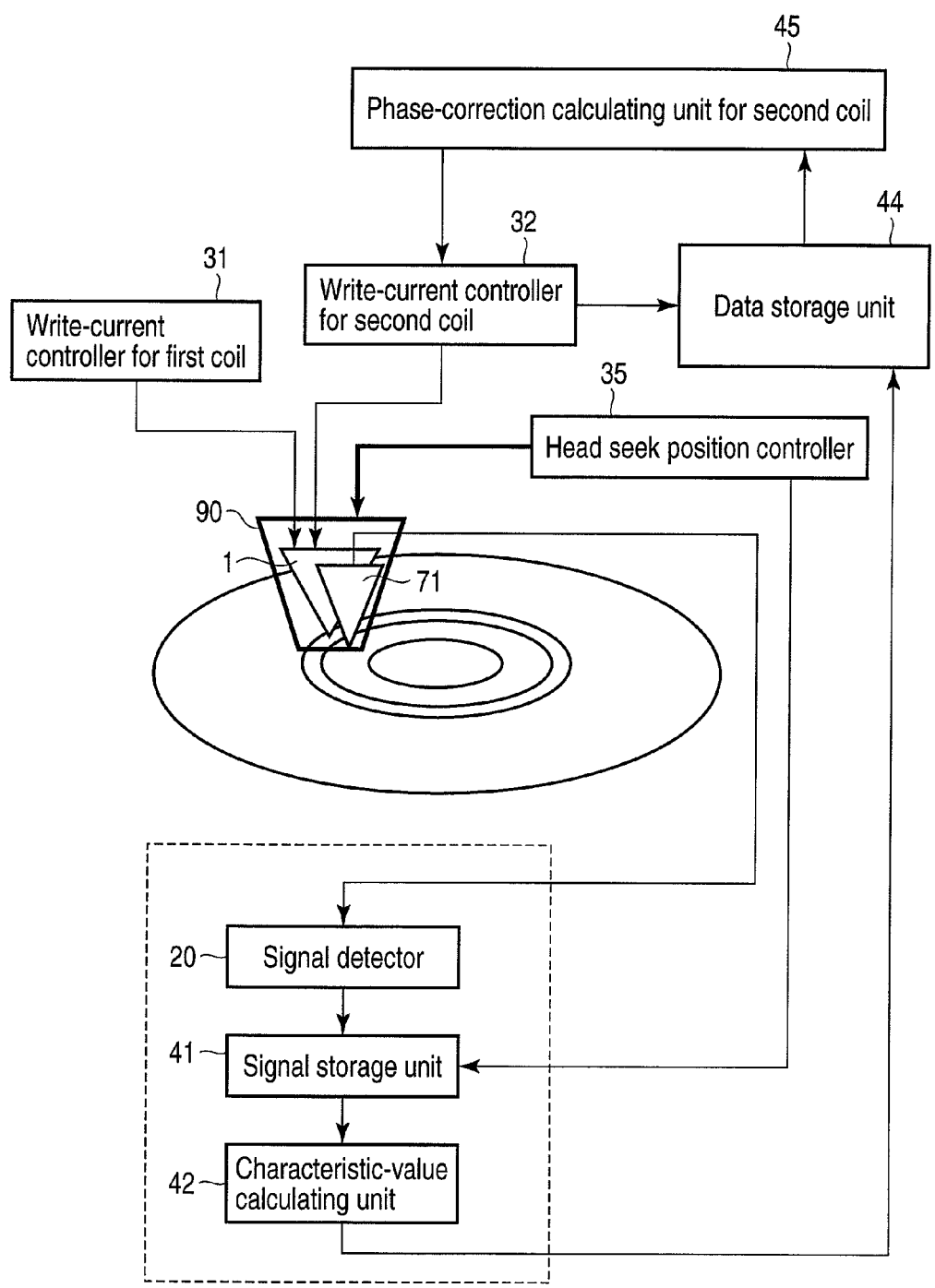
F I G. 6

MAGNETIC DISK DRIVE

CROSS-REFERENCE TO RELATED APPLICATIONS

This application is based upon and claims the benefit of priority from Japanese Patent Application No. 2008-324330, filed Dec. 19, 2008, the entire contents of which are incorporated herein by reference.

BACKGROUND

1. Field

One embodiment of the present invention relates to a magnetic disk drive comprising two pole cores.

2. Description of the Related Art

It is demanded for a perpendicular magnetic recording head to reduce the physical width of the main pole responding to high track density. If the physical width of the main pole is reduced, however, a steep field gradient in the cross-track direction cannot be achieved due to fringe characteristics of the write field generated from the main pole in the cross-track direction, making it difficult to maintain recording ability.

Conventionally, it has been proposed that a side shield be formed in order to improve the fringe characteristics of the main pole (see, for example, IEEE TRANSACTION ON MAGNETICS, pp. 2914-2919, Vol. 41, No. 10, October 2005). Once a magnetic recording head having a side shield has been manufactured, however, the fringe characteristics of the main pole can only be adjusted with a write current supplied to the main-pole coil. Thus, if the physical width, bevel angle or flare angle of the main pole is deviated from a design value by process dispersion, degraded fringe characteristics can hardly be corrected.

In view of this, it may be considered that a first coil is arranged for a first pole core comprising the main pole and a second coil is arranged for a second pole core (subsidiary pole), tip ends of which are arranged on both sides of the main pole in the track-width direction so as to control current supplied to the first coil and the current supplied to the second coil independently, thereby to improve the fringe characteristics of the main pole.

In the recording system that uses two pole cores that are magnetically independent of each other as described above, the currents supplied to the coils independently wound around the two pole cores may produce a phase difference by which a write field distribution may be distorted and further magnetization patterns recorded on the magnetic disk may have write distortion. If the write distortion is produced, the waveform of read output is also distorted, bringing about degradation in the bit error rate.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is a view showing the write head as viewed from the ABS;

FIG. 6 is a block diagram describing a method of controlling the write current in Example 3;

DETAILED DESCRIPTION

Various embodiments according to the invention will be described hereinafter with reference to the accompanying drawings. In general, according to one embodiment of the invention, there is provided a magnetic disk drive comprising: a magnetic disk to be subjected to perpendicular recording; a first pole core comprising a main pole configured to record signals on the magnetic disk; a first coil wound around the first pole core; a second pole core magnetically independent of the first pole core, tip ends of which are arranged on both sides of the main pole; a second coil wound around the second pole core; a read unit comprising an element configured to read data recorded on the magnetic disk; and a correction unit configured to correct a current phase difference between the first and second coils.

EXAMPLE 1

Figure 1:
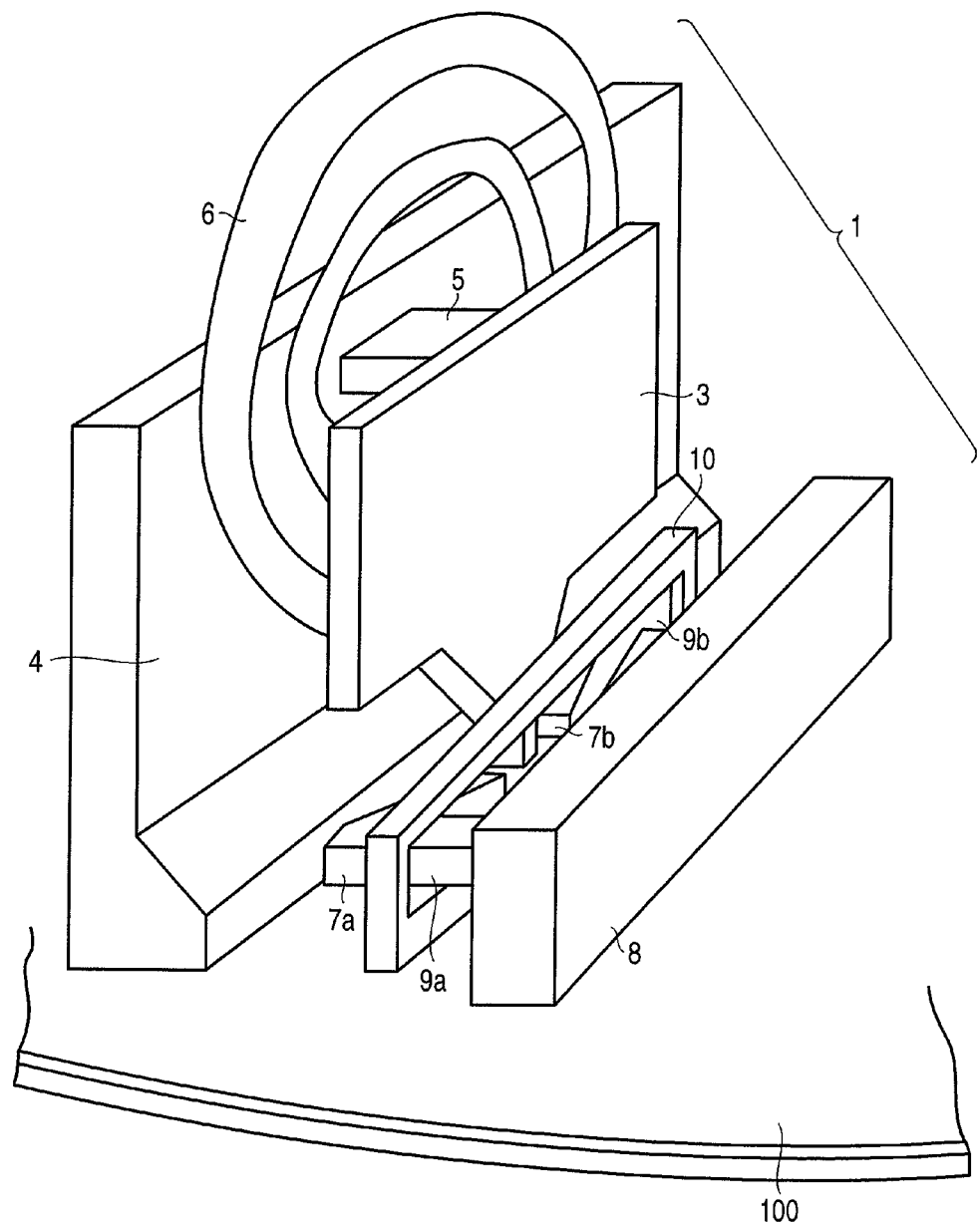
FIG. 1 is a perspective view showing a write head and a magnetic disk of Example 1.
Figure 2:
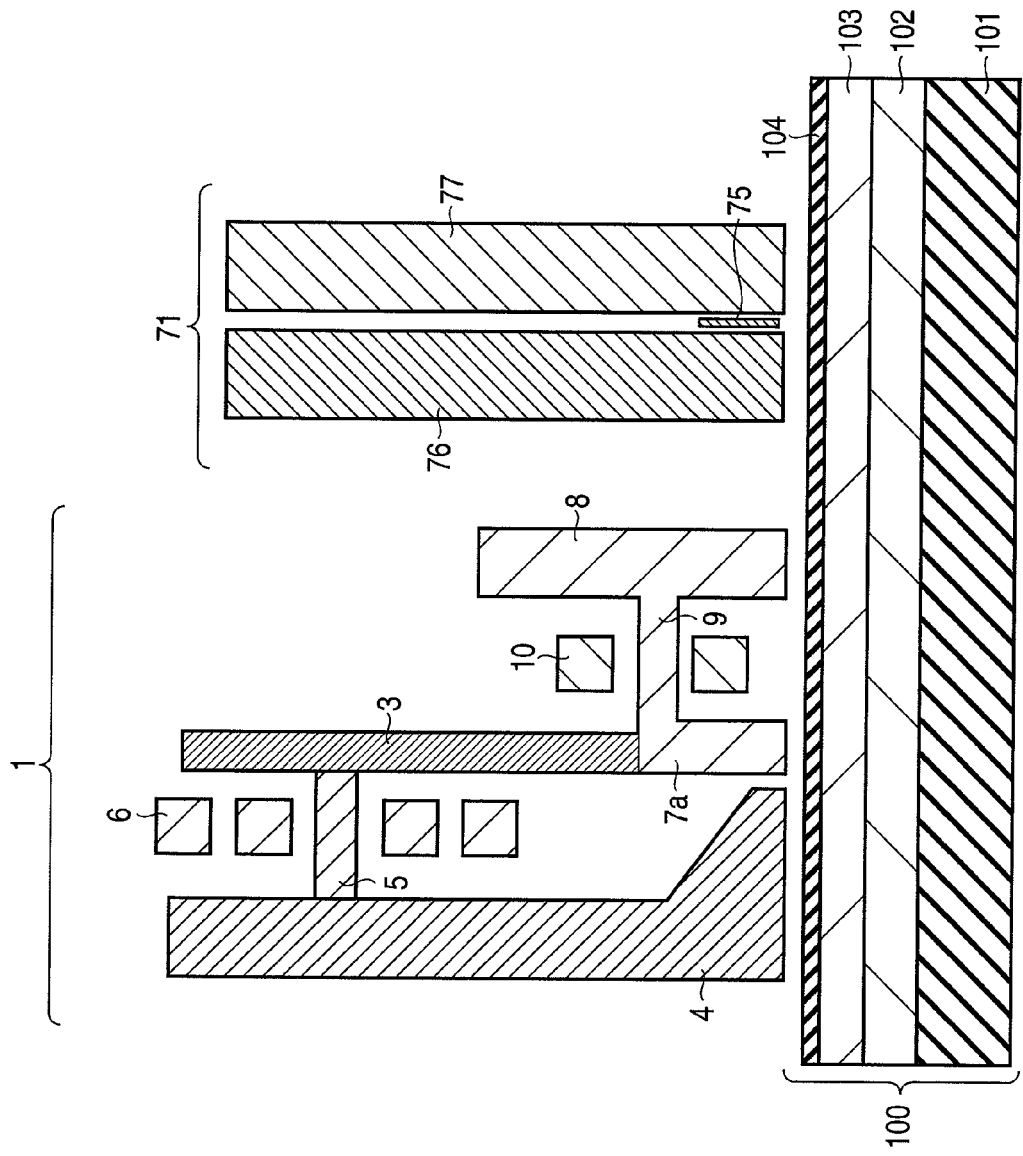
FIG. 2 is a cross-sectional view showing the write head of Example 1.
Figure 4:
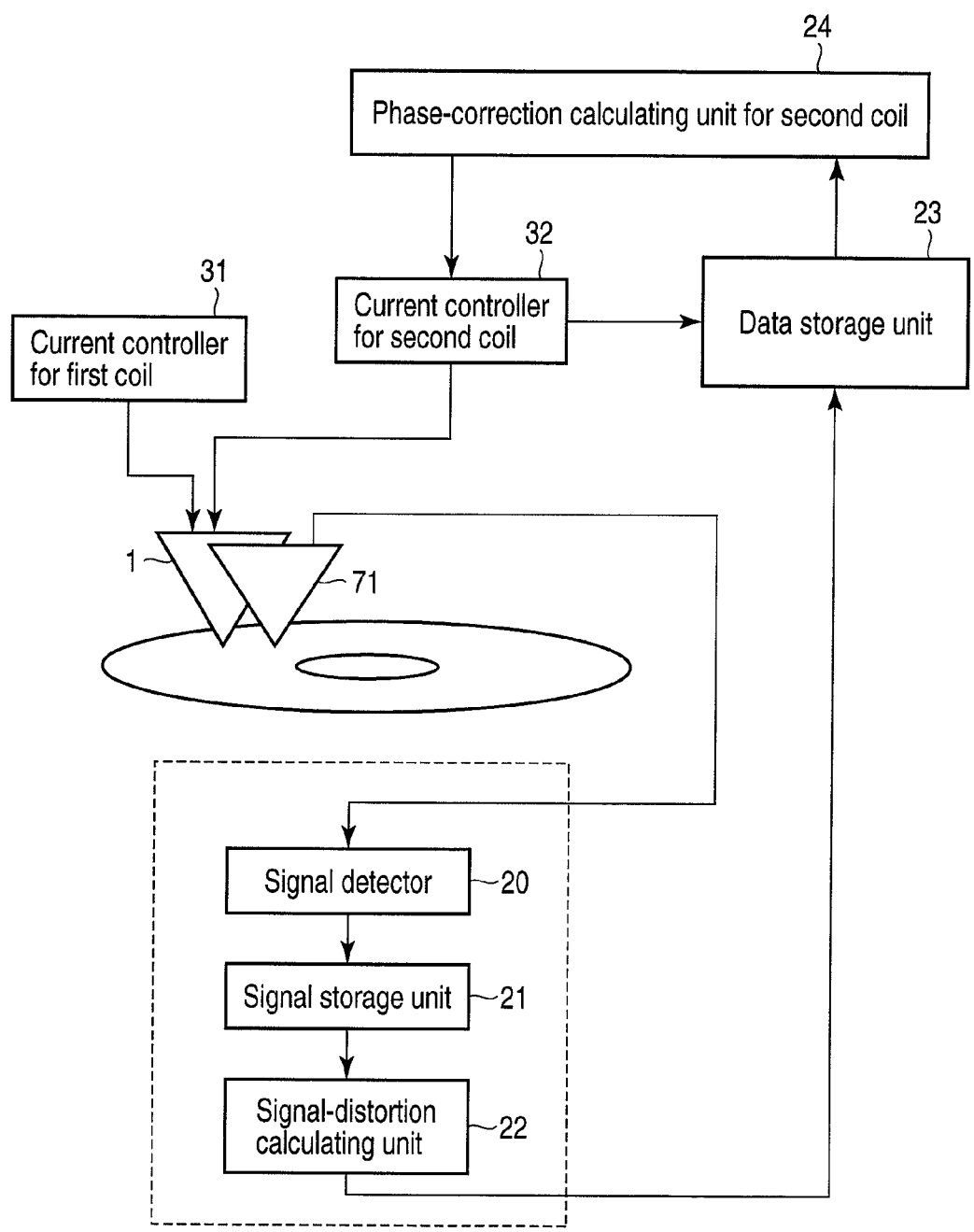
FIG. 4 is a block diagram describing a method of controlling the write current in Example 1.

A magnetic disk drive of Example 1 will be described with reference to FIGS. 1 to 4. FIG. 1 is a perspective view showing the write head 1 and the magnetic disk 100 installed in the magnetic disk drive. FIG. 2 is a cross-sectional view showing the write head 1, the read head 71, and the magnetic disk 100. FIG. 3 is a view showing the write head 1 as viewed from its air-bearing surface (ABS). FIG. 4 is a block diagram showing the current phase controller for the write head 1.

The write head 1 comprises a first pole core, a first coil 6, a second pole core, and a second coil 10. The first pole core comprises a main pole 3 made of a soft magnetic material, a return yoke 4 made of a soft magnetic material, and a contact 5 magnetically connecting the main pole 3 to the return yoke 4. The first coil 6 is wound around the first pole core. The second pole core comprises side pole cores 7a and 7b and a return yoke 8. The side pole cores 7a and 7b are made of a soft magnetic material and have tip ends projecting toward the sides of the main pole 3 in the track-width direction. The return yoke 8 is magnetically coupled to the side pole cores 7a and 7b through contacts 9a and 9b. The second coil 10 is wound around the second pole core.

The magnetic disk 100 comprises a substrate 101, a soft magnetic layer 102 provided on the substrate 101 and made of a soft magnetic material, a magnetic recording layer 103 provided on the soft magnetic layer 102, which is subjected to perpendicular recording, and a protective film 104 provided on the magnetic recording layer 103. The read head 71 includes a magnetoresistive film 75 and shields 76 and 77 sandwiching the magnetoresistive film 75 in the head traveling direction, and is configured to read data recorded on the magnetic disk 100.

A method of controlling a current supplied to the write head 1 will be described with reference to FIG. 4. The magnetic head includes the write head 1 and the read head 71. Control means include a signal detector 20 configured to detect a signal from the read head 71, a signal storage unit 21 configured to store the read signal, a signal-distortion calculating unit 22 configured to calculate signal distortion based on the signal, a first write-current controller 31 configured to supply a current to the first coil 6, a second write-current controller 32 configured to supply a current to the second coil 10, a data storage unit 23 configured to store the waveform of the current supplied to the second coil 10 and the read signal distortion, and a phase-correction calculating unit 24 configured to calculate the phase of the write current from the waveform of the write current and the signal distortion amount.

Currents are supplied to the first coil 6 and the second coil 10, whereby a magnetic field is generated from the tip end of the main pole 3. Data is written on the magnetic disk 100. The read head 71 detects the signal of the data. The signal detector 20 detects the read signal, and the signal storage unit 21 stores the waveform of the read signal. The signal-distortion calculating unit 22 calculates the waveform distortion of the read signal. The distortion of the waveform and the waveform of the write current supplied to the second coil 10 are stored in the data storage unit 23 at the same time. From the relation between the distortion amount of the waveform thus calculated and the waveform of the write current, the phase-correction calculating unit 24 calculates the timing of supplying a current to the second coil 10. At the timing thus calculated, the current controller 32 supplies the current to the second coil 10. The feedback operations are repeated several times, thus optimizing the phase value of the write current to be supplied to the second coil 10. A high-quality waveform of the read signal can thereby be obtained.

EXAMPLE 2

Figure 5:
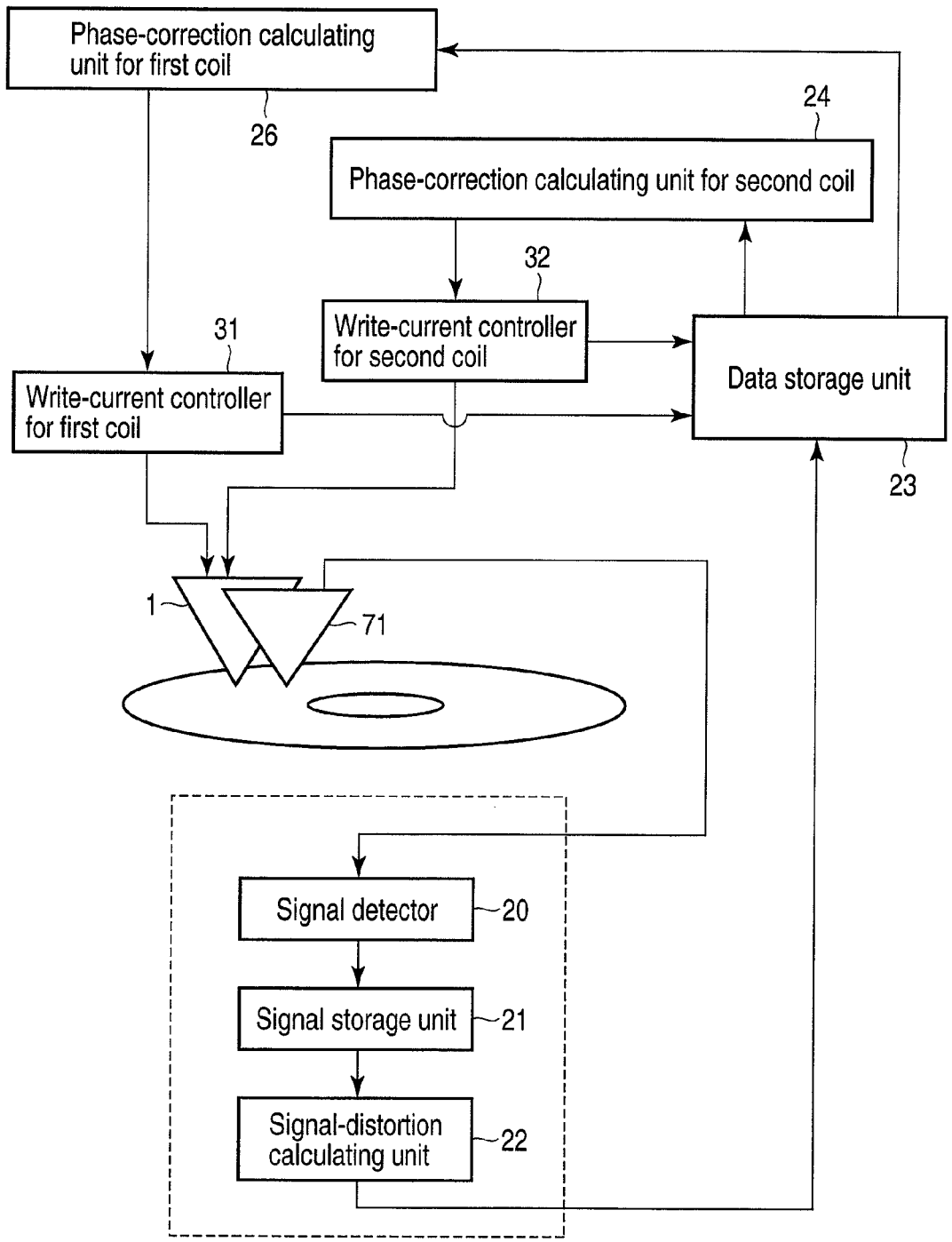
FIG. 5 is a block diagram describing a method of controlling the write current in Example 2.

FIG. 5 is a block diagram showing a current phase controller for the write head 1 in Example 2. The magnetic head includes a write head 1 and the read head 71. Control means include a signal detector 20 configured to detect a signal from the read head 71, a signal storage unit 21 configured to store the read signal, a signal-distortion calculating unit 22 configured to calculate signal distortion based on the signal, a first write-current controller 31 configured to supply a current to the first coil 6, a second write-current controller 32 configured to supply a current to the second coil 10, a data storage unit 23 configured to store the waveform of the currents supplied to the first and second coil 6 and 10 and the read signal distortions, a phase-correction calculating unit 24 configured to calculate the phase of the write current from the waveform of the write current supplied to the second coil 10 and the signal distortion, and a phase-correction calculating unit 26 configured to calculate the phase of write current from the waveform of the write current supplied to the first coil 6 and the signal distortion.

Currents are supplied to the first coil 6 and the second coil 10, whereby a magnetic field is generated from the tip end of the main pole 3. Data is written on the magnetic disk 100. The read head 71 detects the signal of the data. The signal detector 20 detects the read signal, and the signal storage unit 21 stores the waveform of the read signal. The signal-distortion calculating unit 22 calculates the waveform distortion of the read signal. The distortion of the waveform and the waveform of the write current supplied to the first coil 6 and the second coil 10 are stored in the data storage 23 at the same time. From the relation between the distortion amount of the waveform thus calculated and the waveform of the write current, the phase-correction calculating unit 24 calculates the timing of supplying a current to the second coil 10 and the current controller 32 supplies the current to the second coil 10, and also the phase-correction calculating unit 26 calculates the timing of supplying a current to the first coil 6 and the current controller 31 supplies the current to the first coil 6. The feedback operations are repeated several times, thus optimizing the phase of the write currents to be supplied to the first coil 6 and second coil 10. A high-quality waveform of the read signal can thereby be obtained.

EXAMPLE 3

FIG. 6 is a block diagram showing the current phase controller for the write head 1 of Example 3. A magnetic head 90 includes the write head 1 and a read head 71. Control means include a head seek position controller 35 configured to control the position of the magnetic head 90, a signal detector 20 configured to detect a signal from the read head 71, a signal storage unit 41 configured to store the read signal and the head position data at the same time, a characteristic calculating unit 42 configured to calculate a characteristic value from the position signal and read signal, a write-current controller 31 configured to supply a current to the first coil 6, a write-current controller 32 configured to supply a current to the second coil 10, a data storage unit 44 configured to store the waveform of the current supplied to the second coil 10 and the characteristic value, and a phase-correction calculating unit 45 configured to calculate the phase of the write current from the waveform of the write current supplied to the second coil 10 and the characteristic value.

Currents are supplied to the first coil 6 and the second coil 10, whereby a magnetic field is generated from the tip end of the main pole 3. Data is written on the magnetic disk 100. The read head 71 detects a signal of the data. The characteristic calculating unit 42 calculates a characteristic value from the correlation of the position signal and read signal, which are stored in the signal storage unit 41 configured to store the position signal from the head seek position controller 35 and the signal from the signal detector 20 at the same time. The characteristic value and the waveform of the write current to be supplied to the second coil 10 are simultaneously stored in the data storage unit 44. From the relation between the characteristic value thus calculated and the waveform of the write current, the timing of supplying a current to the second coil 10 is calculated. At the timing thus calculated, the write-current controller 32 supplies a current to the second coil 10. The feedback operations are repeated several times, thus optimizing the phase of the write current to be supplied to the second coil 10. A high-quality waveform of the read signal can thereby be obtained.

Figure 7:
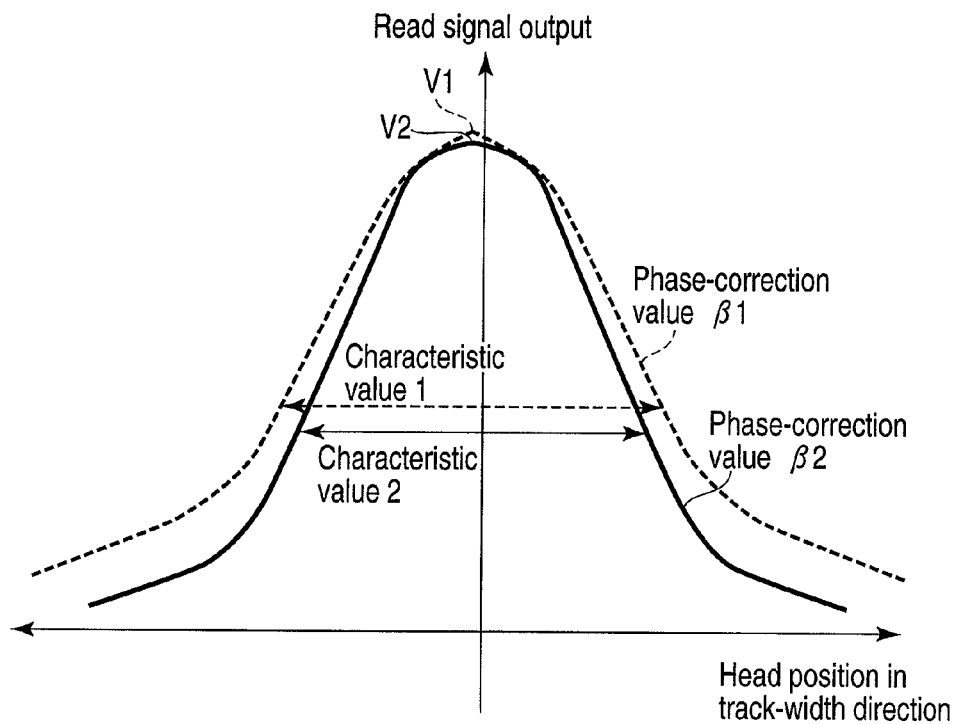
FIG. 7 is a diagram describing the function of the calculating unit in Example 3.
Figure 8:
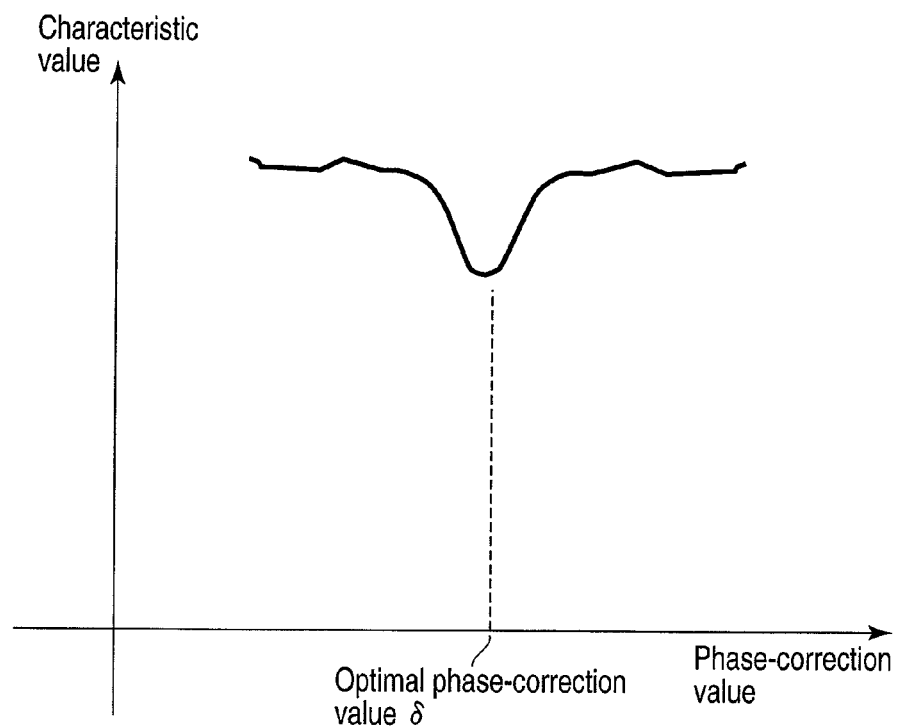
FIG. 8 is a diagram describing the function of the calculating unit in Example 3.

FIG. 7 is a diagram showing an exemplary characteristic value. FIG. 8 is a diagram describing how an optimal phase correction value is calculated from the characteristic value. FIG. 7 is a track profile diagram that illustrates the relation between the position the magnetic head in the track width direction and the value the read signal has at each position. As shown in FIG. 7, the characteristic value may be a track width that represents a half the largest output in the track profile. The characteristic value changes in accordance with a phase-correction value $\beta$. It changes in accordance with distribution of the magnetic field from the tip of the write head to the magnetic disk. For example, the phase-correction value β that minimizes the characteristic value as shown in FIG. 8 should better be used as optimal phase-compensating value δ.

EXAMPLE 4

Figure 9:
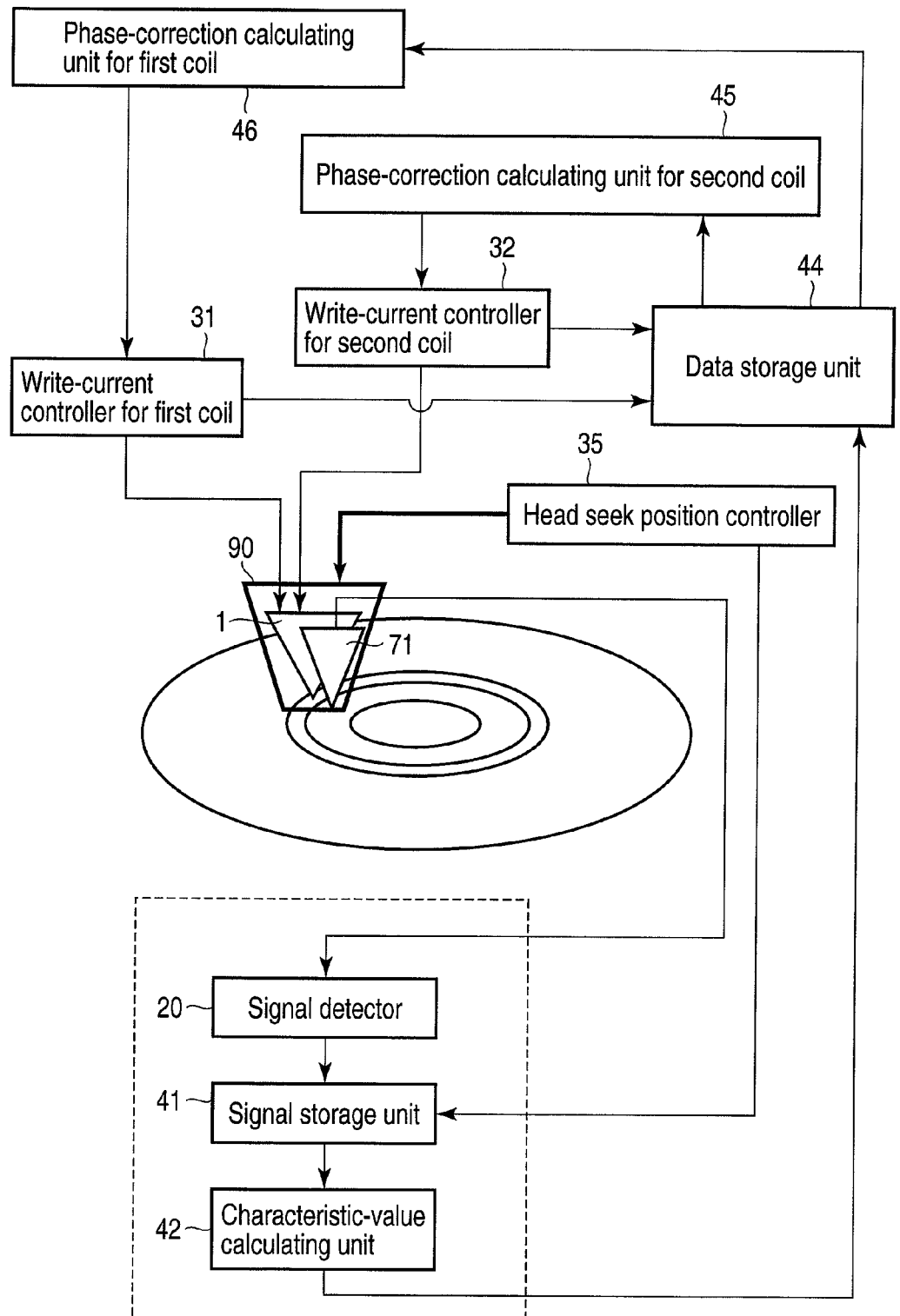
FIG. 9 is a block diagram describing a method of controlling the write current in Example 4.

FIG. 9 is a block diagram showing a current phase controller for the write head 1 in Example 4. The magnetic head 90 includes the write head 1 and the read head 71. Control means include a head seek position controller 35 configured to control the position of the magnetic head 90, a signal detector 20 configured to detect a signal from the read head 71, a signal storage unit 41 configured to store the read signal and the head position data at the same time, a characteristic calculating unit 42 configured to calculate a characteristic value from the position signal and read signal, a write-current controller 31 configured to supply a current to the first coil 6, a write-current controller 32 configured to supply a current to the second coil 10, a data storage 44 configured to store the waveforms of the currents supplied to the first coil 6 and second coil 10 and the characteristic value, a second phase-correction calculating unit 45 configured to calculate the phase of the write current from the waveform of the write current for the second coil 10 and the characteristic value, and a first phase-correction calculating unit 46 configured to calculate the phase of the write current from the waveform of the write current for the first coil 6 and the characteristic value.

Currents are supplied to the first coil 6 and the second coil 10, whereby a magnetic field is generated from the tip end of the main pole 3. Data is written on the magnetic disk 100. The read head 71 detects a signal of the data. The characteristic-value calculating unit 42 calculates a characteristic value from the correlation of the position signal and read signal, which are stored in the signal storage unit 41 configured to store the position signal from the head seek position controller 35 and the signal from the signal detector 20 at the same time. The characteristic value and the waveform of the write current to be supplied to the first coil 6 and second coil 10 are simultaneously stored in the data storage 44. From the relation between the characteristic value thus calculated and the waveform of the write current, the second phase-correction calculating unit 45 calculates the timing of supplying a current to be supplied to the second coil 10 and the write-current controller 32 supplies a current to the second coil 10, and also the first phase-correction calculating unit 46 calculates the timing of supplying a current to the first coil 6 and the write-current controller 31 supplies a current to the first coil 6. The feedback operations are repeated several times, thus optimizing the phase of the write current to be supplied to the second coil 10. A high-quality waveform of the read signal can thereby be obtained.

EXAMPLE 5

Figure 10:
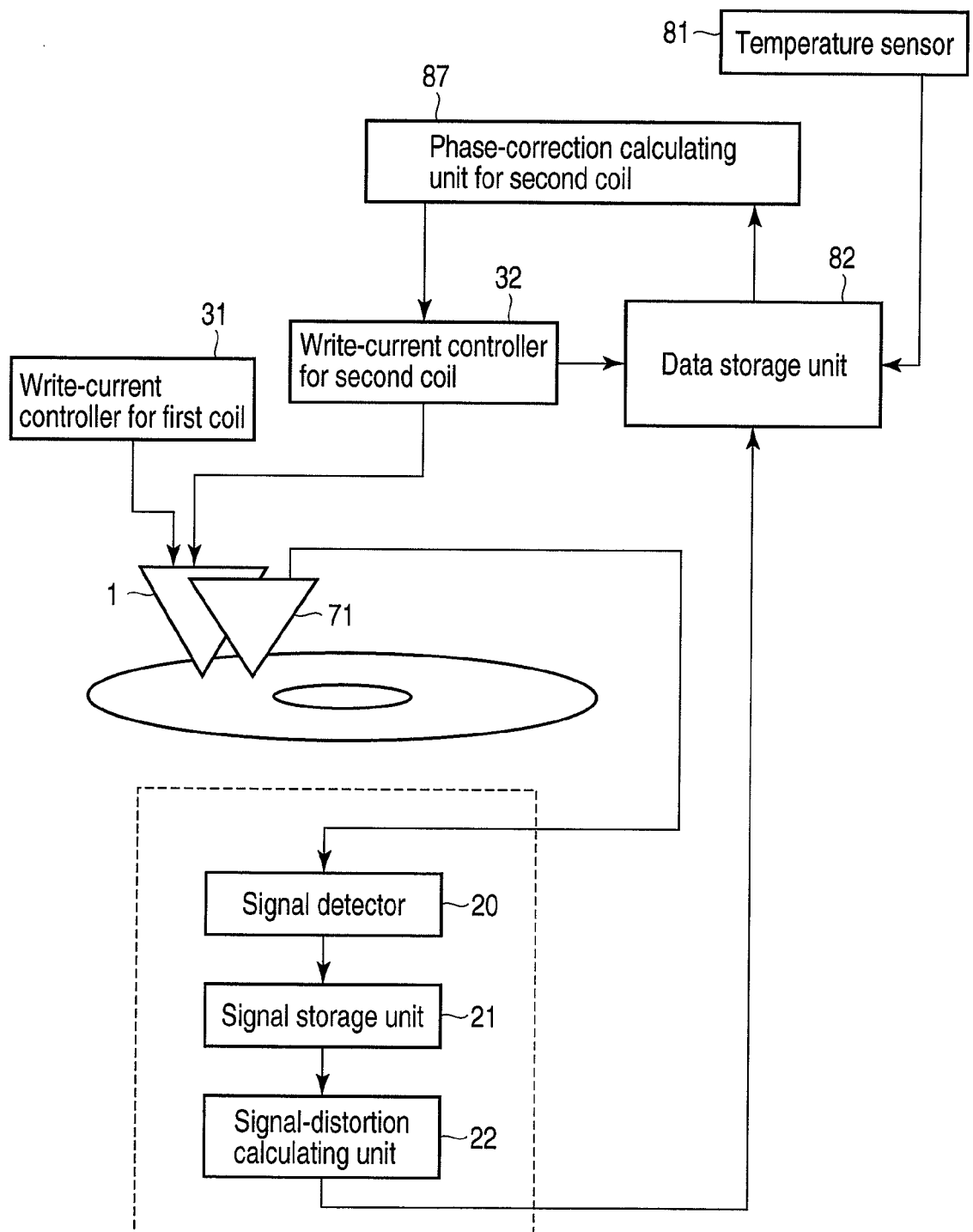
FIG. 10 is a block diagram describing a method of controlling the write current in Example 5.

FIG. 10 is a block diagram showing a current phase controller for the write head 1 in Example 5. The magnetic head includes the write head 1 and the read head 71. Control means include a signal detector 20 configured to detect a signal from the read head 71, a signal storage unit 21 configured to store the read signal, a signal-distortion calculating unit 22 configured to calculate signal distortion from the signal, a temperature sensor 81, a write-current controller 31 configured to supply a current to the first coil 6, a write-current controller 32 configured to supply a current to the second coil 10, a data storage unit 82 configured to store the waveform of the current supplied to the second coil 10, the distortion of the read signal and the temperature, and a phase-correction calculating unit 87 configured to calculate the phase of the write current from the waveform of the write current and the distortion of the read signal.

Currents are supplied to the first coil 6 and the second coil 10, whereby a magnetic field is generated from the tip end of the main pole 3. Data is written on the magnetic disk 100. The read head 71 detects a signal of the data. The signal detector 20 detects the read signal, and the signal storage unit 21 stores the waveform of the read signal. The signal-distortion calculating unit 22 calculates the waveform distortion of the read signal. The distortion amount of the waveform and the waveform of the write current to be supplied to the second coil 10 are stored in the data storage 82 at the same time. Further, the data from the temperature sensor 81 is stored in the data storage 82, too. From the relation between the read-signal waveform distortion amount thus calculated and the waveform of the write current, the phase-correction calculating unit 87 calculates the timing of supplying a current to the second coil 10. At the timing thus calculated, the write-current controller 32 supplies a current to the second coil 10. The feedback operations are repeated several times, thus optimizing the phase of the write current to be supplied to the second coil 10. A high-quality waveform of the read signal can thereby be obtained. Since the phase-correction value is adjusted on the basis of the temperature data from the temperature sensor, the phase-correction value can accord with the environmental temperature.

EXAMPLE 6

Figure 11:
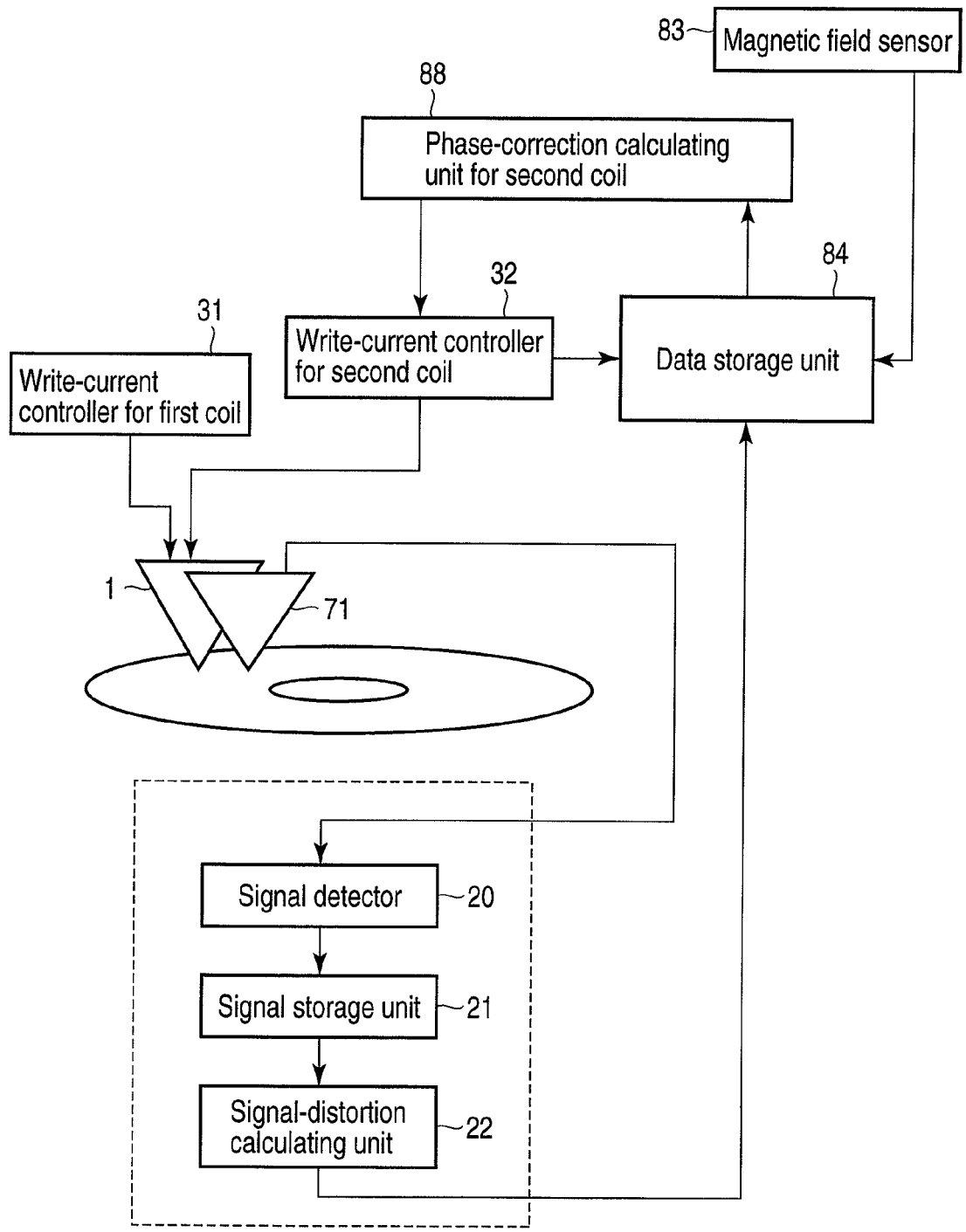
FIG. 11 is a block diagram describing a method of controlling the write current in Example 6.

FIG. 11 is a block diagram showing a current phase controller for the write head 1 in Example 6. The magnetic head includes the write head 1 and the read head 71. Control means include a signal detector 20 configured to detect a signal from the read head 71, a signal storage unit 21 configured to store the read signal, a signal-distortion calculating unit 22 configured to calculate signal distortion from the signal, a magnetic field sensor 83 configured to sense a magnetic field in the disk, a write-current controller 31 configured to supply a current to the first coil 6, a write-current controller 32 configured to supply a current to the second coil 10, a data storage 84 configured to store the waveform of the current supplied to the second coil 10, the distortion of the read signal and the magnetic field, and a phase-correction calculating unit 88 configured to calculate the phase of the write current from the waveform of the write current and the distortion of the read signal.

Currents are supplied to the first coil 6 and the second coil 10, whereby a magnetic field is generated from the tip end of the main pole 3. Data is written on the magnetic disk 100. The read head 71 detects a signal of the data. The signal detector 20 detects the read signal, and the signal storage unit 21 stores the waveform of the read signal. The signal-distortion calculating unit 22 calculates the waveform distortion of the read signal. The distortion of the waveform and the waveform of the write current supplied to the second coil 10 are stored in the data storage 84 at the same time. Further, the data from the magnetic field sensor 83 is stored in the data storage 84, too. From the relation between the read-signal waveform distortion thus calculated and the waveform of the write current, the phase-correction calculating unit 88 calculates the timing of supplying a current to the second coil 10. At the timing thus calculated, the write-current controller 32 supplies a current to the second coil 10. The feedback operations are repeated several times, thus optimizing the phase of the write current to be supplied to the second coil 10. A high-quality waveform of the read signal can thereby be obtained. Since the phase-correction value is adjusted on the basis of the magnetic field data from the magnetic field sensor, the phase-correction value can accord with the internal environment of the disk drive.

The disadvantages that may arise if the current phase control for the write head is not carried out will be described with reference to FIG. 12A to 12C. The advantages attained if the current phase control for the write head is carried out in accordance with Example 1 will be described with reference to FIGS. 12D to 12F.

Figure 12A:
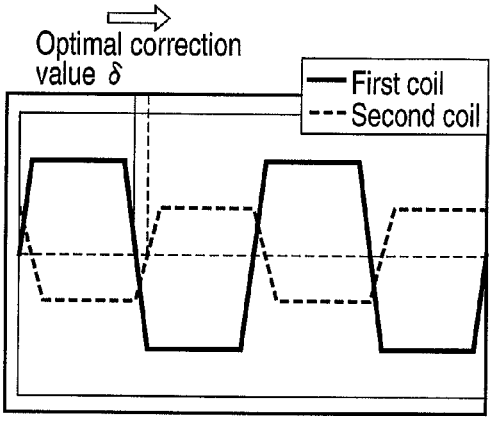
FIGS. 12A to 12F are diagrams showing current waveforms in Comparative Example and Example 1.

FIG. 12A shows the waveforms of currents flowing in the first coil 6 and second coil 10 of Comparative Example. FIG. 12B shows the waveform of a read signal in the Comparative Example. FIG. 12C shows the differential waveform of the read signal in the Comparative Example. In the Comparative Example, the timings of the currents to be supplied to the first soil 6 and the second coil 10 are offset. This is because the phases of these currents are not controlled at all. Consequently, the waveform of the read signal is distorted at the leading edge as is illustrated in FIG. 12B. The distortion is conspicuous when the waveform is differentiated as shown in FIG. 12C. As shown in FIG. 12C, the sub-peak appears with a delay after the main peak. The sub-peak results in a signal error in the high-density recording, inevitably increasing the bit error rate.

Figure 12D:
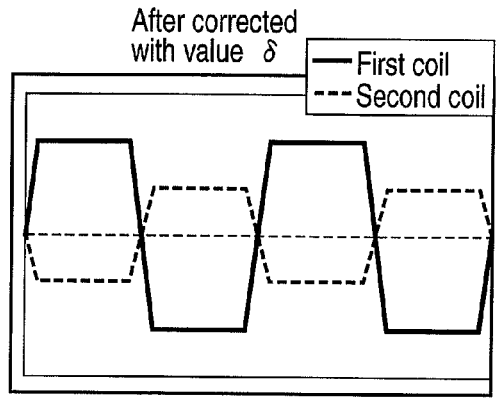
Figure 12B:
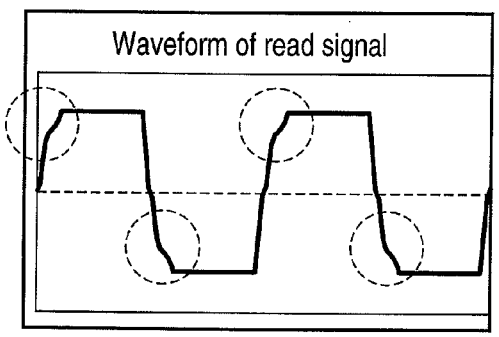
Figure 12E:
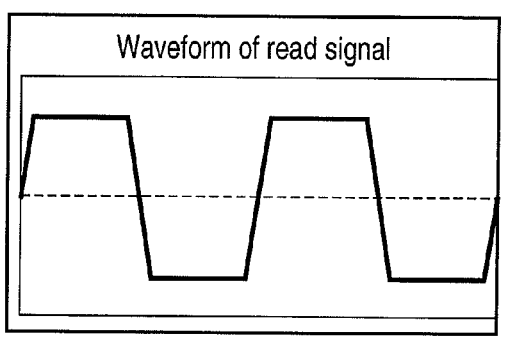
Figure 12C:
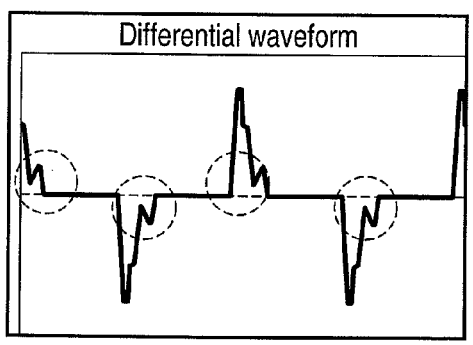
Figure 12F:
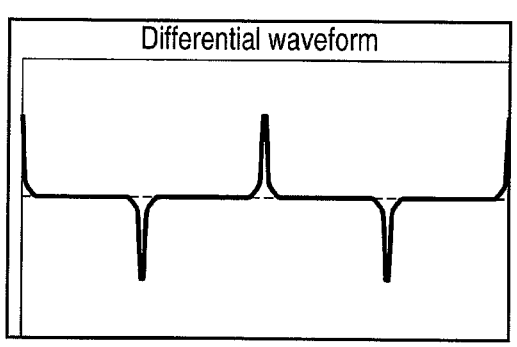

FIG. 12D shows the waveforms of the currents flowing in the first coil 6 and second coil 10 in Example 1. FIG. 12E shows the waveform of a read signal in Example 1. FIG. 12F shows the differential waveform of the read signal in Example 1. In Example 1, the phases of current waveforms flowing in the first coil 6 and second coil 10 coincide with each other and have no distortion as shown in FIG. 12E. The differential waveform shown in FIG. 12F has no sub-peaks, either, showing that the resolution has been improved. Thus, the bit error rate is improved in high-density recording, and data can be recorded at high density.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic disk drive comprising:
   a perpendicular recording magnetic disk;
   a first pole core comprising a main pole configured to record signals on the magnetic disk;
   a first coil around the first pole core;
   second pole cores magnetically independent of the first pole core comprising tip ends on both sides of the main pole in a cross-track direction;
   a second coil around the second pole cores;
   a reader configured to read data recorded on the magnetic disk; and
   a correction unit configured to correct a phase difference between a current supplied to the first coil and a current supplied to the second coil.

2. The magnetic disk drive of claim 1, further comprising a comparator configured to compare the phase difference between the current supplied to the first coil and a current supplied to the second coil.

3. The magnetic disk drive of claim 1, further comprising:
   a signal detector configured to detect a waveform of a read signal;
   a signal storage module configured to store the read signal;
   a distortion calculator configured to calculate a distortion amount of the waveform of the read signal;
   a data storage module configured to store a current waveform of the second coil and the distortion amount;
   a phase-correction calculator configured to calculate a phase-correction amount for the current waveform of the second coil; and
   a phase controller configured to control a phase of a current to the second coil in accordance with the distortion amount calculated with the distortion calculator.

4. The magnetic disk drive of claim 3, further comprising:
   a thermometer configured to sense a temperature; and
   a data storage module configured to store the temperature, a waveform of a write current, and the distortion amount.

5. The magnetic disk drive of claim 3, further comprising:
   a magnetic field sensor configured to sense a magnetic field in the magnetic disk; and
   a data storage module configured to store the magnetic field, a waveform of a write current, and the distortion amount.

6. The magnetic disk drive of claim 1, further comprising:
   a signal detector configured to detect a waveform of a read signal;
   a signal storage module configured to store the read signal;
   a distortion calculator configured to calculate a distortion amount of the waveform of the read signal;
   a data storage module configured to store current waveforms of the first and second coils and the distortion amount;
   a phase-correction calculator configured to calculate a phase-correction amount for the current waveforms of the first and second coils; and
   a phase controller configured to control a phase of a current to the first and second coils in accordance with the distortion amount calculated with the distortion calculator.

7. The magnetic disk drive of claim 1, further comprising:
   a position controller configured to control a head position;
   a signal detector configured to detect a waveform of a read signal;
   a first data storage module configured to store the head position and the read signal;
   a distortion calculator configured to calculate a distortion amount of the waveform of the read signal;
   a second data storage module configured to store a current waveform of the second coil and the distortion amount;
   a phase-correction calculator configured to calculate a phase-correction amount for the current waveform of the second coil; and
   a phase controller configured to control a phase of a current to the second coil in accordance with the distortion amount calculated with the distortion calculator.

* * * * *